US008788167B2

(12) United States Patent
Ishikawa et al.

(10) Patent No.: US 8,788,167 B2
(45) Date of Patent: Jul. 22, 2014

(54) CONTROL SYSTEM OF TRANSMISSION

(75) Inventors: Osamu Ishikawa, Chiyoda-ku (JP);
Takeru Okabe, Chiyoda-ku (JP);
Nozomu Kamioka, Chiyoda-ku (JP);
Tomohisa Shoda, Chiyoda-ku (JP);
Masaki Horii, Chiyoda-ku (JP);
Yasufumi Ogawa, Chiyoda-ku (JP);
Shiro Yonezawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1539 days.

(21) Appl. No.: 12/356,796

(22) Filed: Jan. 21, 2009

(65) Prior Publication Data
US 2009/0254258 A1 Oct. 8, 2009

(30) Foreign Application Priority Data

Apr. 7, 2008 (JP) .................................. 2008-099433

(51) Int. Cl.
*G06F 7/00* (2006.01)
*G06F 17/00* (2006.01)
*G06F 19/00* (2011.01)

(52) U.S. Cl.
USPC ............... 701/67; 701/68; 318/299; 318/367; 318/368; 477/62; 477/65

(58) Field of Classification Search
USPC .............. 701/67, 68; 192/84.6; 318/299, 367, 318/368; 477/62, 65, 166
See application file for complete search history.

(56) References Cited

U.S. PATENT DOCUMENTS

| 4,878,396 | A | | 11/1989 | Grunnberg | |
| 5,486,146 | A | * | 1/1996 | Asahara et al. | 477/65 |
| 7,164,966 | B2 | * | 1/2007 | Sudolcan | 700/239 |
| 7,218,120 | B2 | * | 5/2007 | Shimoyama et al. | 324/523 |
| 7,828,132 | B2 | * | 11/2010 | Swensgard et al. | 192/84.6 |

(Continued)

FOREIGN PATENT DOCUMENTS

DE   33 09 427 A1   10/1983
DE   197 23 393 A1  12/1997

(Continued)

OTHER PUBLICATIONS

Broussard, Darrell G., Understanding Short Circuit Motor Contribution, 1999.*

(Continued)

*Primary Examiner* — Jeffrey Shapiro
(74) *Attorney, Agent, or Firm* — Sughrue Mion, PLLC; Richard C. Turner

(57) ABSTRACT

A clutch control unit includes a clutch motor controller that controls a clutch motor. The clutch motor controller has a target clutch motor current computing unit that computes a target clutch motor current for adjusting torque of the clutch motor to be torque corresponding to an operating state of the vehicle, and a motor driving and braking selection unit that selects a motor driving mode in which the clutch motor is driven by applying feedback control on an output of the clutch motor or a motor braking mode in which the clutch motor is braked by short-circuiting the clutch motor according to a difference between the target clutch motor current and an actually detected clutch motor current. It thus becomes possible to provide a control system of a transmission that engages a clutch by a motor braking force in a manner that suits the running state of the vehicle.

1 Claim, 7 Drawing Sheets

(56) References Cited

U.S. PATENT DOCUMENTS

| | | | |
|---|---|---|---|
| 8,058,834 B2* | 11/2011 | Okabe et al. | 318/647 |
| 8,229,635 B2* | 7/2012 | Horii et al. | 701/60 |
| 8,239,105 B2* | 8/2012 | Yonezawa et al. | 701/51 |
| 8,340,876 B2* | 12/2012 | Ishikawa et al. | 701/51 |
| 2005/0093496 A1* | 5/2005 | Tokunou et al. | 318/375 |
| 2005/0137043 A1* | 6/2005 | Kinugasa et al. | 475/5 |
| 2005/0187070 A1* | 8/2005 | Takagi | 477/143 |
| 2005/0218904 A1* | 10/2005 | Shimoyama et al. | 324/522 |
| 2005/0284684 A1* | 12/2005 | Tokunou | 180/243 |
| 2006/0108868 A1* | 5/2006 | Ohsaki et al. | 303/154 |
| 2006/0185459 A1* | 8/2006 | Matsumura et al. | 74/335 |
| 2007/0093359 A1* | 4/2007 | Kobayashi et al. | 477/107 |
| 2007/0251793 A1* | 11/2007 | Swensgard et al. | 192/40 |
| 2009/0254258 A1* | 10/2009 | Ishikawa et al. | 701/68 |

FOREIGN PATENT DOCUMENTS

| | | | |
|---|---|---|---|
| GB | 2 313 886 A | 12/1997 | |
| JP | 5-202955 A | 8/1993 | |
| JP | 10-311418 A | 11/1998 | |
| JP | 2002-081472 A | 3/2002 | |
| JP | 2006-070920 A | 3/2006 | |
| JP | 2006-226433 A | 8/2006 | |

OTHER PUBLICATIONS

The free dictionary.com, "The Great Soviet Encyclopedia", 3rd Ed., 1979, "Rheostatic Braking", "Dynamic Braking of Electric Drive", web page copyright (2013), Farlex, Inc.*

Brake Book of Instructions-vol. 3, Section 11, Nov. 2003.*

"Braking a DC Brushed Motor", Electrical Engineering Stack Exchange, p. 1-5, Jul. 11, 2011, printed Aug. 13, 2013.*

Japanese Office Action, corresponding to Japanese Appln. No. 2008-099433, dated Feb. 23, 2010.

German Office Action issued in German Application No. 10 2009 005 204.6 dated Jan. 25, 2013.

* cited by examiner

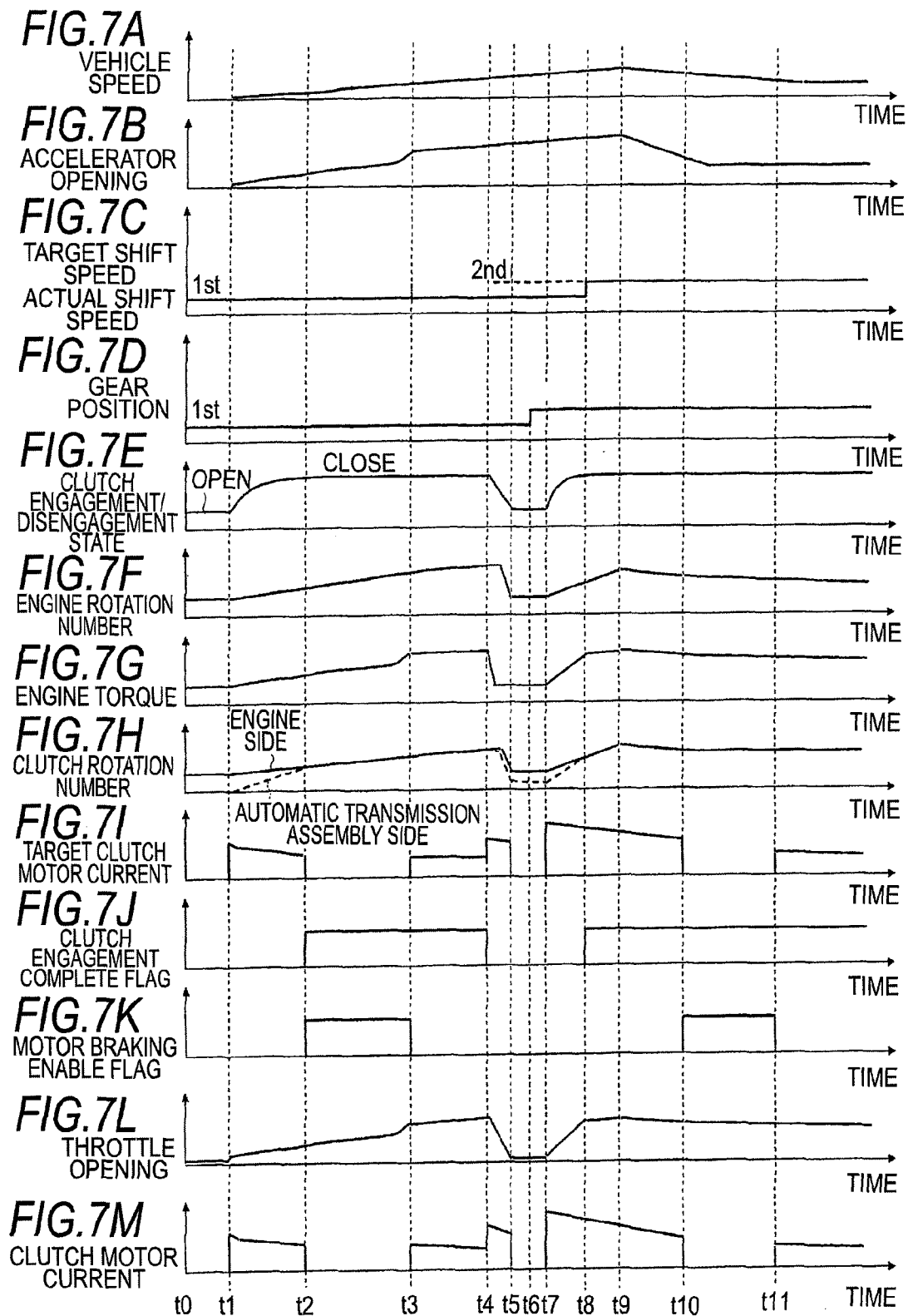

US 8,788,167 B2

CONTROL SYSTEM OF TRANSMISSION

BACKGROUND OF THE INVENTION

1. Field of the Invention

The present invention relates to a control system of a transmission that controls a transmission mounted on a vehicle, such as an automobile, and more particularly, to a control system of a transmission that performs shift control using a motor.

2. Background Art

There is a transmission equipped with a clutch that is mounted on a vehicle, such as an automobile, and capable of changing an engaging force on command. This transmission includes an actuator attached to a dry-type single plate clutch and it is configured in such a manner that the actuator adjusts a clutch engaging force by changing a stroke volume of the clutch. An example of this transmission in the related art is disclosed, for example, in JP-A-2002-81472 (paragraphs [0014] through [0016] and FIG. 2).

According to the transmission equipped with a clutch disclosed in the cited reference, however, in order to run a vehicle while the clutch is in engagement, it is necessary to transmit engine torque to an automatic transmission device via the clutch by generating a clutch engaging force by constantly keeping the actuator in operation. The actuator therefore consumes a large amount of electric power, which raises a problem that fuel efficiency becomes poor.

SUMMARY OF THE INVENTION

The invention was devised in view of the foregoing and therefore provides a control system of a transmission configured to short-circuit a motor that adjusts a clutch engaging force of a transmission equipped with a clutch in response to the running state of the vehicle and thereby to engage the clutch by a motor braking force generated in this instance.

According to one aspect of the invention, a control system of a transmission includes an engine mounted on a vehicle, a transmission having a clutch formed of an engine clutch that is connected to an output shaft of the engine so as to transmit motive power of the engine to a transmission assembly portion and a transmission assembly clutch, and a clutch control unit that engages and disengages the clutch. The clutch control unit has a clutch motor and a clutch motor controller that controls the clutch motor. The clutch motor controller has a target clutch motor current computing unit that computes a target clutch motor current for adjusting torque of the clutch motor to be torque corresponding to an operating state of the vehicle, and a motor driving and braking unit that selects one of a motor driving mode in which the clutch motor is driven by applying feedback control on an output of the clutch motor and a motor braking mode in which the clutch motor is braked by short-circuiting the clutch motor according to a difference between the target clutch motor current computed by the target clutch motor current computing unit and an actually detected clutch motor current.

According to the control system of a transmission of the invention, the clutch is engaged by a braking force generated by short-circuiting a motor that adjusts a clutch engaging force of a transmission equipped with a clutch. It is therefore possible to save power consumption by the motor while the vehicle is running, which can consequently improve the fuel efficiency.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 7 is a flowchart detailing a shift behavior of an automatic transmission device while the vehicle is running according to one embodiment of the invention.

DESCRIPTION OF THE PREFERRED EMBODIMENT

Hereinafter, a preferred embodiment of a control system of a transmission of the invention will be described with reference to the accompanying drawings. It should be appreciated, however, that the invention is not limited to this embodiment.

Figure 1:
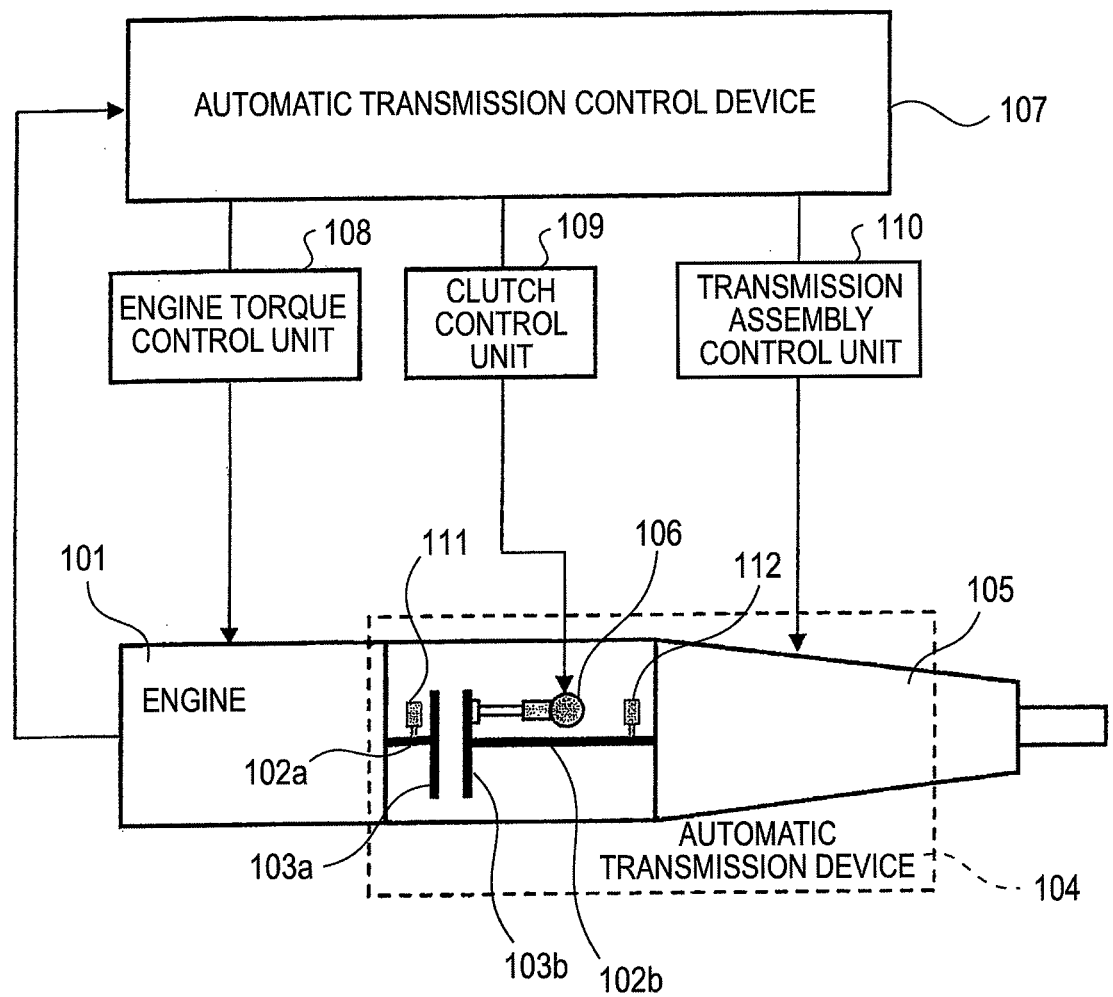
FIG. 1 is a view used to describe a control system of a transmission according to one embodiment of the invention.

FIG. 1 is a view used to describe a control system of a transmission according to one embodiment. Referring to FIG. 1, an output shaft 102a of an engine 101 and an engine clutch 103a are directly coupled, while an automatic transmission assembly clutch 103b is directly coupled to an input shaft 102b of an automatic transmission assembly 105 that changes the shift speed of an automatic transmission device 104. Numeral 106 denotes a clutch motor, and by driving the clutch motor 106, the automatic transmission assembly clutch 103b is caused to stroke, which makes it possible to engage and disengage the engine clutch 103a and the automatic transmission assembly clutch 103b.

In a case where the engine clutch 103a and the automatic transmission assembly clutch 103b are engaged, motive power is transmitted from the engine 101 to the automatic transmission assembly 105. In a case where the engine clutch 103a and the automatic transmission assembly clutch 103b are disengaged, no motive power is transmitted from the engine 101 to the automatic transmission assembly 105.

An automatic transmission control device 107 outputs a command to control an amount of engine torque at a shift and also outputs a command to control the shift speed of the automatic transmission device 104 by engaging the engine clutch 103a and the automatic transmission assembly clutch 103b in the automatic transmission device 104 and by changing the configuration of the automatic transmission assembly 105.

An engine torque control unit 108 controls an amount of engine torque at a shift according to a command from the automatic transmission control device 107. A clutch control unit 109 performs clutch control at a shift according to a command from the automatic transmission control device

107. A transmission assembly control unit 110 controls the shift speed of the automatic transmission assembly 105 according to a command from the automatic transmission control device 107.

An engine clutch rotation number detection sensor 111 is provided to the output shaft 102a of the engine 101. The engine clutch rotation number detection sensor 111 detects the rotation number of the engine clutch 103a by detecting the rotation number of the output shaft 102a of the engine 101 to which the engine clutch 103a is directly coupled. Also, an automatic transmission assembly clutch rotation number detection sensor 112 is provided to the input shaft 102b of the automatic transmission assembly 105. The automatic transmission assembly clutch number detection sensor 112 detects the rotation number of the automatic transmission assembly clutch 103b by detecting the rotation number of the input shaft 102b of the automatic transmission assembly 105 to which the automatic transmission assembly clutch 103b is directly coupled.

Figure 2:
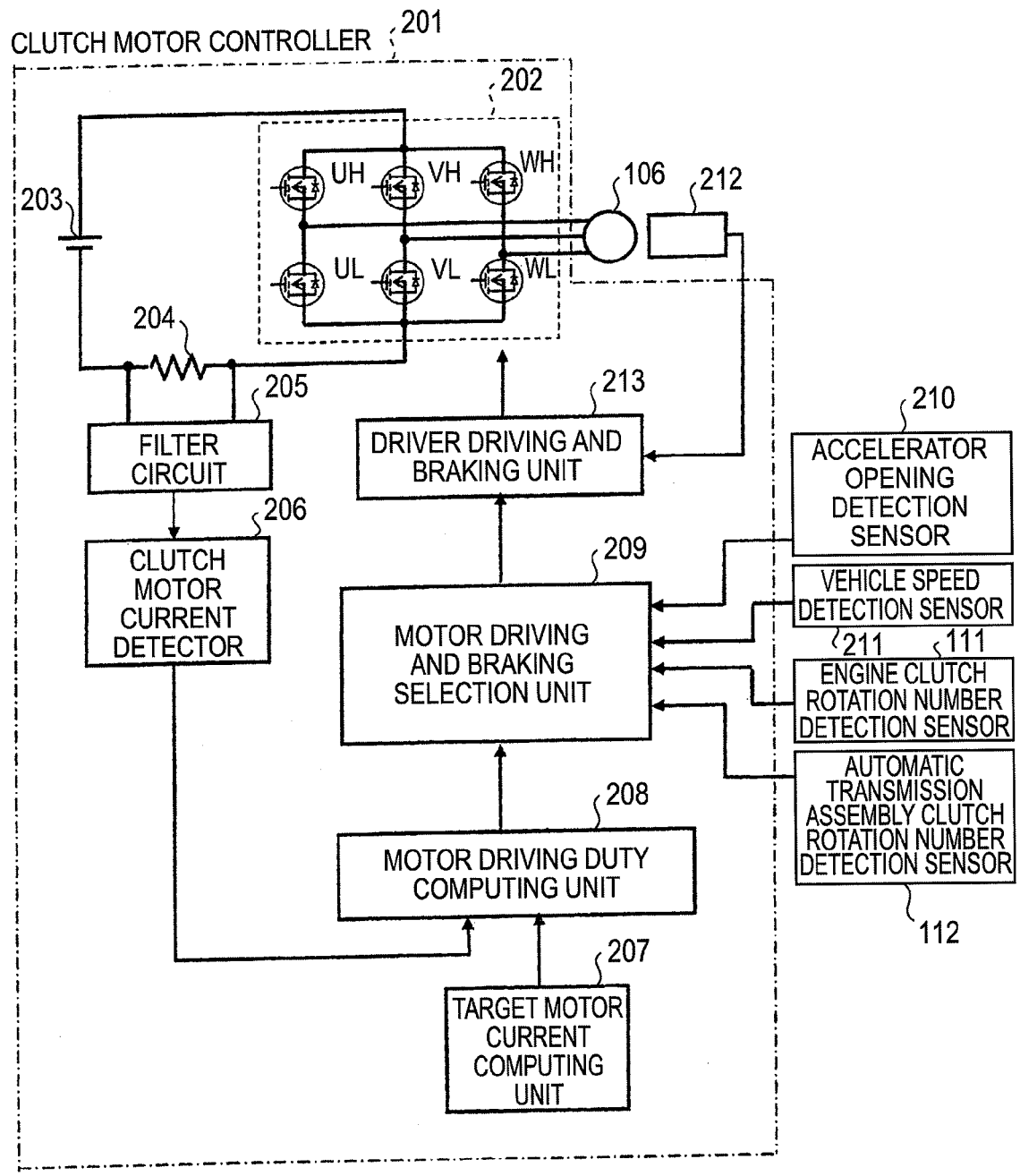
FIG. 2 is a view used to describe the system configuration of a clutch motor controller according to one embodiment of the invention.

FIG. 2 is a view used to describe the system configuration of a clutch motor controller included in the clutch control unit 109. The clutch control unit 109 is an assembly configured so as to make the rotation angle of the clutch motor 106 proportional to a stroke volume of the automatic transmission assembly clutch 103b and it is capable of adjusting an amount of engagement by the torque of the clutch motor 106. A clutch motor controller 201 is to control the clutch motor 106 that drives the automatic transmission assembly clutch 103b, and is configured as follows.

As is shown in FIG. 2, a clutch motor drive circuit 202 is formed of six FETs UH, UL, VH, VL, WH, and WL, and each is connected to a power supply 203. A current flown into the clutch motor 106 is detected by a shunt resistance 204 and a voltage across the shunt resistance 204 is averaged by a filter circuit 205. A clutch motor current detector 206 detects a current flown into the clutch motor 106 from the voltage across the shunt resistance 204 that has been averaged by the filter circuit 205.

In addition, a target clutch motor current computing unit 207 computes a target clutch motor current according to a shift state and an operating state of the vehicle. A clutch motor driving duty computing unit 208 then computes a driving duty to be supplied to the clutch motor drive circuit 202 on the basis of an actual current detected by the clutch motor current detector 206 and the target current computed by the target clutch motor current computing unit 207. Because the torque of the clutch motor 106 is proportional to an amount of the clutch motor current, an amount of motor torque is adjusted to be the target amount by applying feedback control on an amount of the clutch motor current.

A motor driving and braking selection unit 209 selects whether the clutch motor 106 is switched to a driving mode or a braking mode according to the accelerator opening of the driver detected by an accelerator opening detection sensor 210, a vehicle speed detected by a vehicle speed detection sensor 211, the engine clutch rotation number detected by the engine clutch rotation number detection sensor 111, and the automatic transmission assembly clutch rotation number detected by the automatic transmission assembly clutch rotation number detection sensor 112. The rotation position of the clutch motor 106 is detected by a motor position detector, for example, a clutch motor rotation position detection sensor 212.

In a case where the motor driving mode is selected by the motor driving and braking selection unit 209, a driver driving and braking unit 213 selects FETs to be driven according to the motor position detected by the clutch motor rotation position detection sensor 212 and drives the clutch motor drive circuit 202 according to the driving duty computed by the clutch motor driving duty computing unit 208 for these FETs. In a case where the motor braking mode is selected, the driver driving and braking unit 213 brakes the clutch motor 106 by short-circuiting the clutch motor 106.

Figure 3:
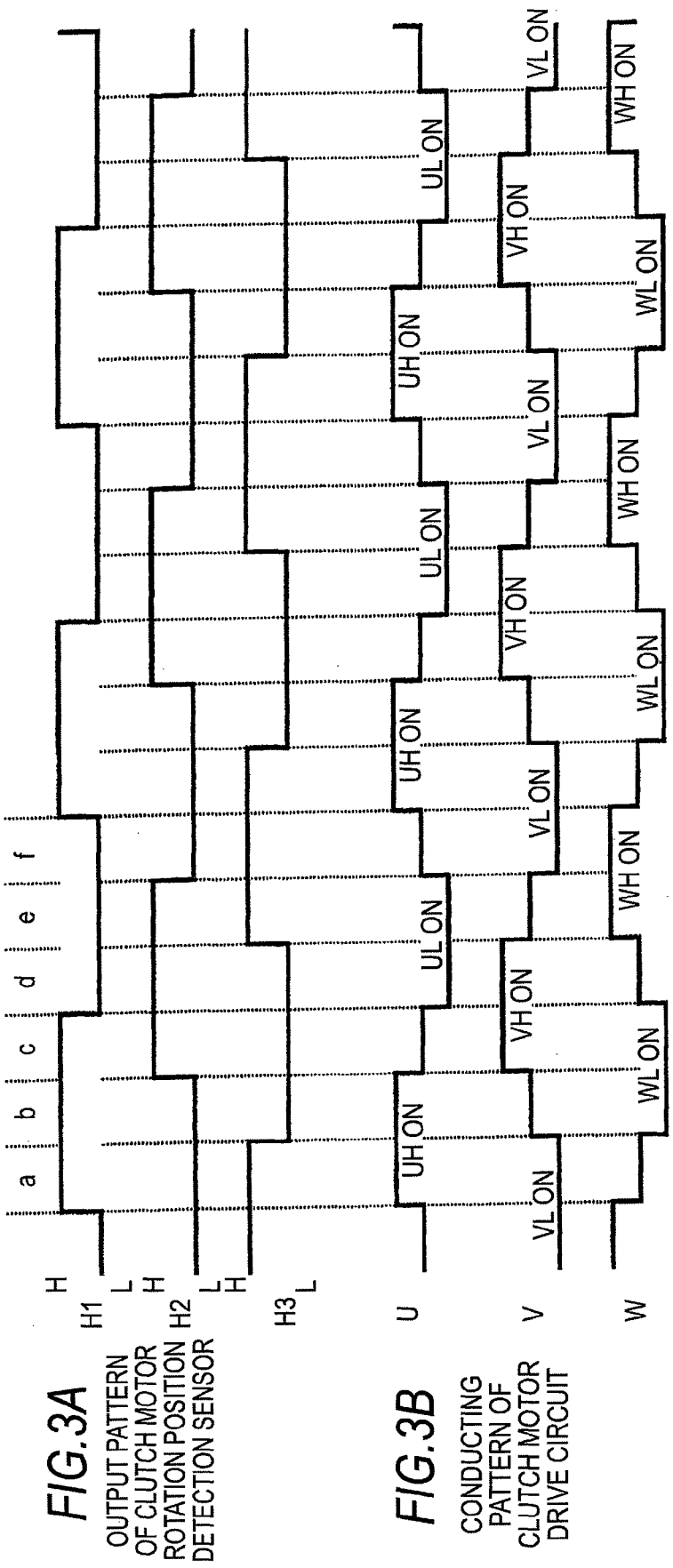
FIG. 3 is a view showing the relation of an output pattern of a motor rotation position detection sensor and a conducting pattern of a motor drive circuit according to one embodiment of the invention.

FIG. 3 is a view showing a drive pattern of the clutch motor drive circuit 202 when the clutch motor 106 is rotated in one direction in the motor driving mode with respect to the rotation position information of the clutch motor 106 detected by the clutch motor rotation position detection sensor 212.

Referring to FIG. 3, a letter A indicates an output pattern of the clutch motor rotation position detection sensor 212, and it shows output patterns of sensors H1, H2, and H3 in a case where the clutch motor 106 formed of a 3-phase brushless motor is energized and driven by 120 degrees. Outputs of the sensors H1, H2, and H3 are either at a high level (H) or a low level (L) and these sensors repetitively output six patterns in alphabetical order of a to f in response to the rotation angle of the clutch motor 106. A letter B indicates a conducting pattern of the clutch motor drive circuit 202 for the output pattern of the clutch motor rotation position detection sensor 212, and it shows the driving states of the FETs in the respective phases.

For example, in the case of a in FIG. 3, the FETs UH and VL in the clutch motor drive circuit 202 are switched ON when the output pattern of the clutch motor rotation position detection sensor 212 is (H1, H2, H3)=(H, L, H).

In the case of b in FIG. 3, the FETs UH and WL in the clutch motor drive circuit 202 are switched ON when the output pattern of the clutch motor rotation position detection sensor 212 is (H1, H2, H3)=(H, L, L).

In this manner, by switching the FET conducting patterns of the clutch motor drive circuit 202 for the output patterns of the clutch motor rotation position detection sensor 212, it becomes possible to rotate the clutch motor 106 in a direction for the automatic transmission assembly clutch 103b to engage with the engine clutch 103a.

In addition, in the motor braking mode, the clutch motor 106 is short-circuited by switching OFF the FETs UH, VH, and WH in the clutch motor drive circuit 202 in a period of the motor braking mode and by switching ON the FETs UL, VL, and WL in a period of the motor braking mode.

In a case where the clutch motor 106 is in a short-circuited state, a motor driving force that has been generated in the motor driving state and engages the engine clutch 103a and the automatic transmission assembly clutch 103b is no longer generated, which causes the automatic transmission assembly clutch 103b to stroke to a disengagement side. Because it is configured in such a manner that the rotation angle of the clutch motor 106 is proportional to a stroke volume of the automatic transmission assembly clutch 103b, the clutch motor 106 rotates in a direction opposite to the rotation direction when the motor is driven (the stroke direction in which the automatic transmission assembly clutch 103b engages with the engine clutch 103a).

In a case where the clutch motor 106 is short-circuited, however, a back electromotive force is generated inside the clutch motor 106 and braking torque in a direction opposite to the rotational direction is generated by an external force. Accordingly, in a case where the clutch motor 106 is rotated by a force (external force) that causes the automatic transmission assembly clutch 103b to stroke to the disengagement side while the clutch motor 106 is braked, braking torque in a direction opposite to the force (external force) that causes the automatic transmission assembly clutch 103b to stroke to the disengagement side is generated in the clutch motor 106 by the back electromotive force. This braking torque prevents the automatic transmission assembly clutch 103b from stroking to the disengagement side. The engagement of the engine clutch 103a and the automatic transmission assembly clutch 103b is thus maintained, which makes it possible to transmit motive power of the engine 101 to the automatic transmission assembly 105. It should be noted, however, that the clutch engaging force in the motor braking mode becomes smaller than the clutch engaging force in the motor driving mode.

Figure 4:
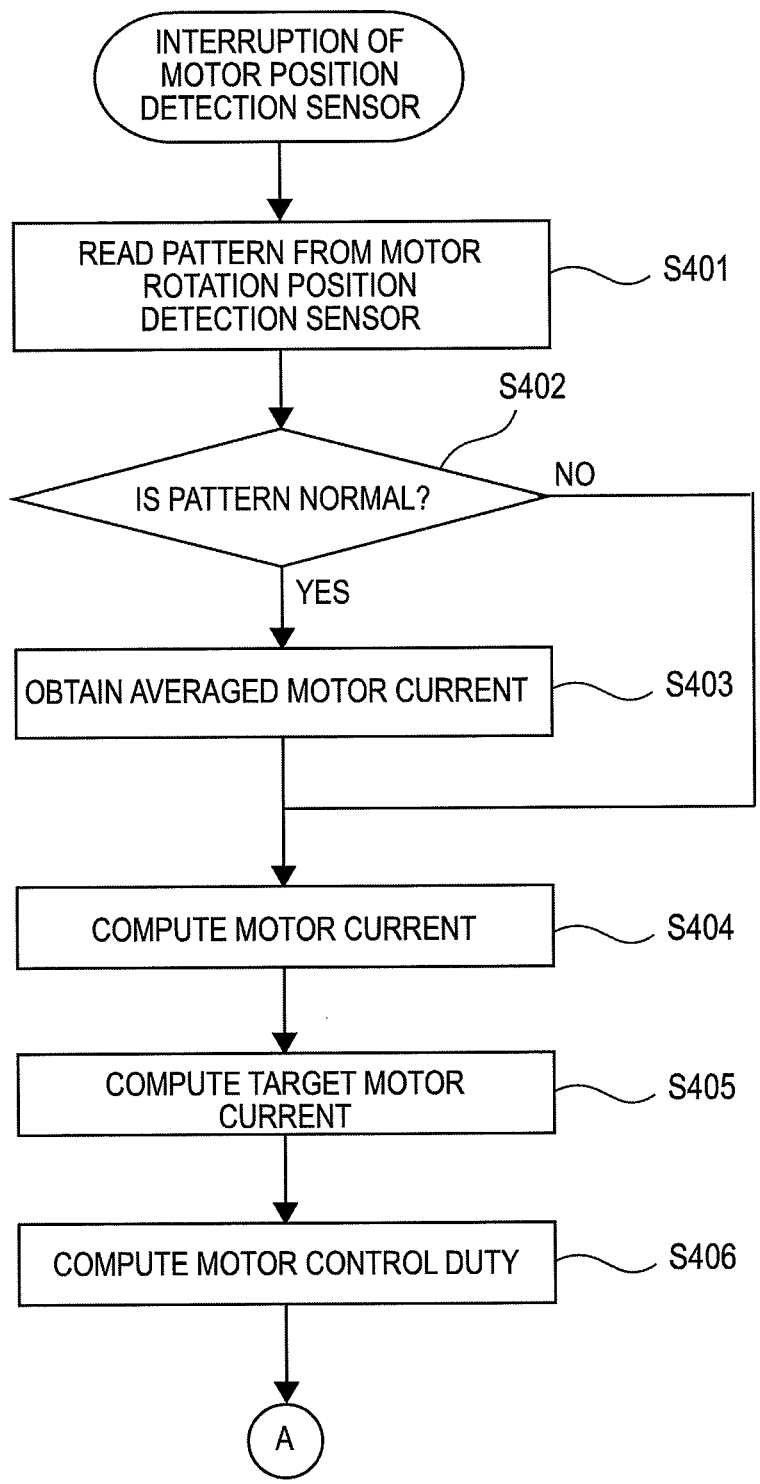
FIG. 4 is a flowchart detailing a control method of a clutch motor according to one embodiment of the invention.
Figure 5:
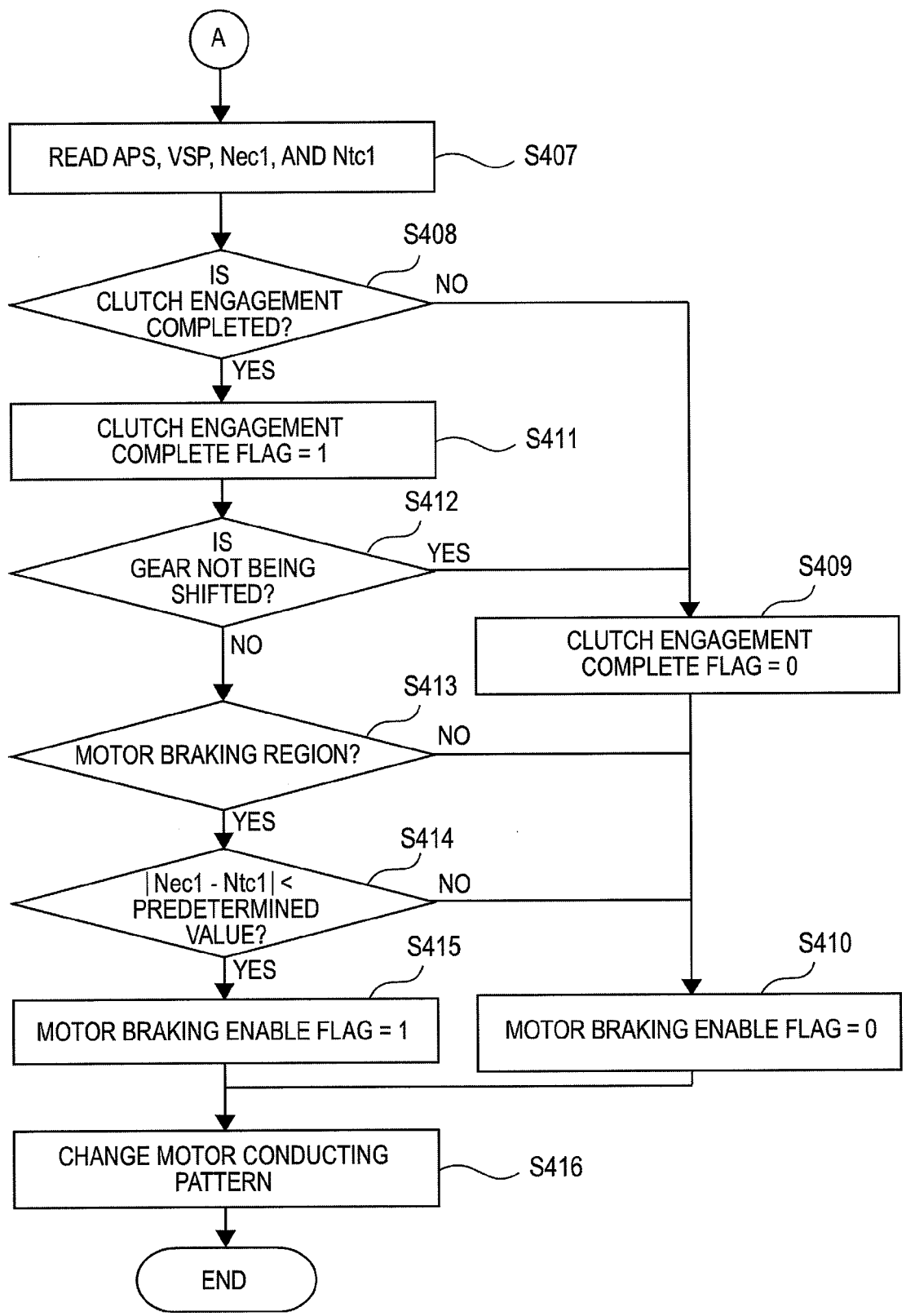
FIG. 5 is a flowchart continuing from the flowchart of FIG. 4 and detailing the control method of the clutch motor according to one embodiment of the invention.

FIG. 4 and FIG. 5 are flowcharts detailing a control method of the clutch motor 106 to address a change in an output signal of the clutch motor rotation position detection sensor 212. The flowcharts of FIG. 4 and FIG. 5 will be described with reference to FIG. 1 and FIG. 2.

Referring to FIG. 4 and FIG. 5, initially, the pattern of the clutch motor rotation position detection sensor 212 is read in Step 401. In Step 402, it is determined whether the pattern of the clutch motor rotation position detection sensor 212 thus read is normal. The operations in Step 401 and Step 402 are carried out by the driver driving and braking unit 213.

As is shown in FIG. 3, there are a total of six output patterns for the clutch motor rotation position detection sensor 212. When the clutch motor 106 rotates forward or backward from a particular pattern, there is only one corresponding pattern for each rotation direction. An abnormality can be therefore determined upon detection of any pattern other than the corresponding pattern.

In a case where the pattern is determined to be normal in Step 402, the flow proceeds to Step 403, and in a case where the pattern is determined to be abnormal, the flow proceeds to Step 404.

Step 403 is a step in which a current of the clutch motor 106 is averaged, and the averaged voltage is detected by the filter circuit 205.

Step 404 is a step in which a current of the clutch motor 106 is computed. A current of the clutch motor 106 is computed by the clutch motor current detector 206 on the basis of the voltage detected by the filter circuit 205 in Step 403 and the resistance value of the shunt resistance 204, after which the flow proceeds to Step 405.

Step 405 is a step in which a target clutch motor current is computed. The target clutch motor current is to adjust the motor torque to be motor torque suitable to the operating state and computed by the target clutch motor current computing unit 207.

In Step 406, a feedback computation is carried out by the clutch motor driving duty computing unit 208 so that the current of the clutch motor 106 computed in Step 404 coincides with the target clutch motor current computed in Step 405. The motor control duty is thus computed.

In Step 407, the accelerator opening (APS) detected by the accelerator opening detection sensor 210, the vehicle speed (VSP) detected by the vehicle speed detection sensor 211, the engine clutch rotation number (Nec1) detected by the engine clutch rotation number detection sensor 111, and the automatic transmission assembly clutch rotation number (Ntc1) detected by the automatic transmission assembly clutch rotation number detection sensor 112 are read out.

In Step 408, whether the engine clutch 103a and the automatic transmission assembly clutch 103b are engaged is determined. In a case where the absolute value of a difference between the engine clutch rotation number (Nec1) and the automatic transmission assembly clutch rotation number (Ntc1) is smaller than a clutch engagement determination value α, it is determined that the engine clutch 103a and the automatic transmission assembly clutch 103b are engaged.

Accordingly, the flow proceeds to Step 411 in which a clutch engagement complete flag is set to 1, after which the flow proceeds to Step 412.

In a case where a difference between the engine clutch rotation number (Nec1) and the automatic transmission assembly clutch rotation number (Ntc1) is larger than the clutch engagement determination value α, it is determined that the engine clutch 103a and the automatic transmission assembly clutch 103b are not engaged. Accordingly, the flow proceeds to Step 409 in which the clutch engagement complete flag is reset to 0, after which the flow proceeds to Step 410 in which a motor braking enable flag is reset to 0.

In Step 412, it is determined whether the current moment is in a period during which the actual shift speed is to reach the target shift speed since the target shift speed changed. In other words, it is determined whether the gear is not being shifted. In a case where the gear is being shifted, the flow proceeds to Step 409 in which the clutch engagement complete flag is reset to 0. The flow subsequently proceeds to Step 410 in which the motor braking enable flag is reset to 0. In a case where the gear is not being shifted, the flow proceeds to Step 413.

In Step 413, it is selected whether the engine clutch 103a and the automatic transmission assembly clutch 103b are engaged in the motor driving mode or they are engaged in the motor braking mode on the basis of the accelerator opening (APS) and the vehicle speed (VSP). The motor driving mode is a mode in which the engine clutch 103a and the automatic transmission assembly clutch 103b are engaged by a driving force of the clutch motor 106. The motor braking mode is a mode in which the engine clutch 103a and the automatic transmission assembly clutch 103b are engaged by a braking force of the clutch motor 106.

Figure 6:
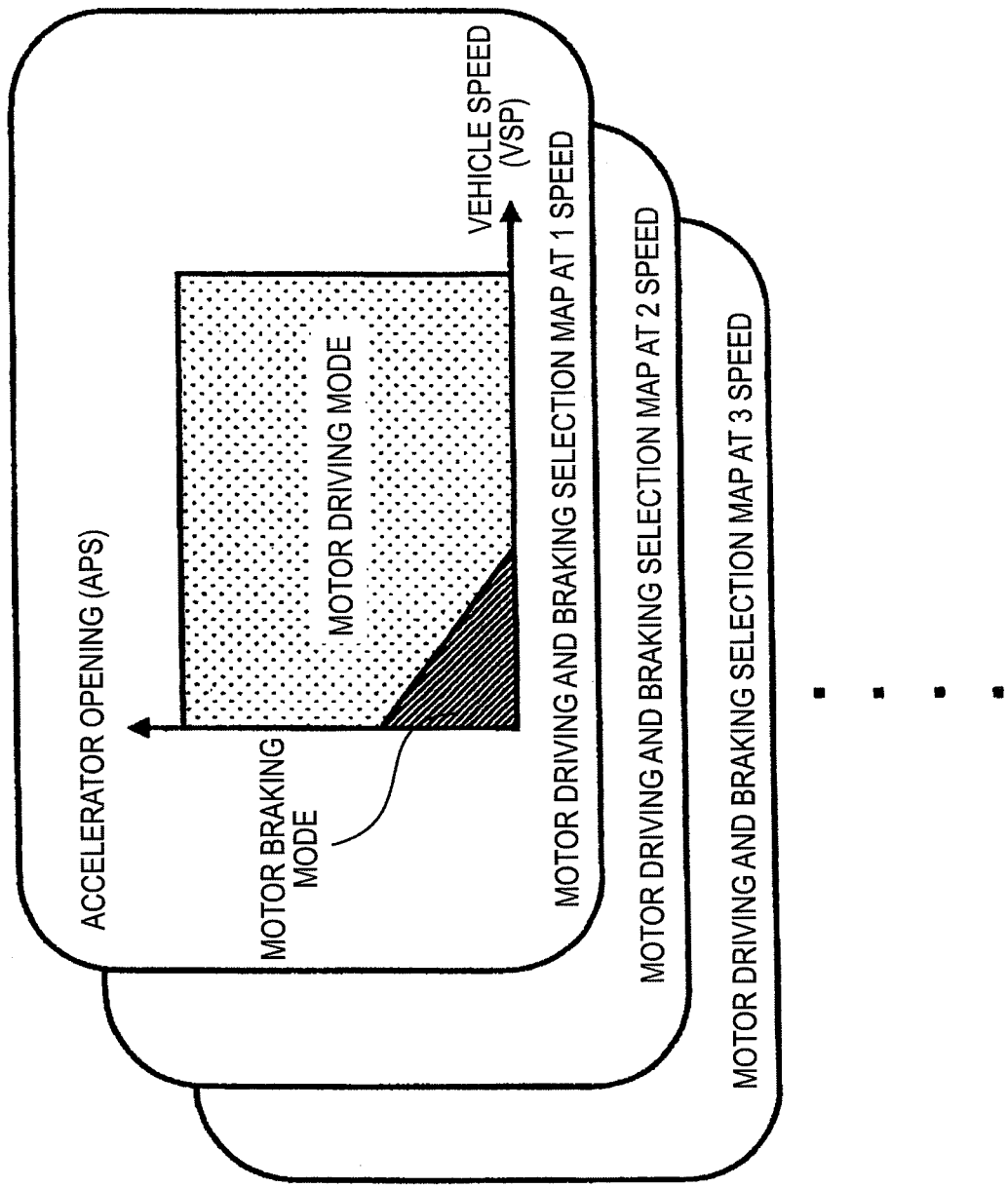
FIG. 6 is a schematic view showing data maps used to select a motor driving mode or a motor braking mode when the clutch control is performed for the clutch motor according to one embodiment of the invention.

To be more concrete, as is shown in FIG. 6, whether the vehicle speed (VSP) and the accelerator opening (APS) are in an operation region where the mode should be the motor driving mode or in an operation region where the mode should be the motor braking mode is determined according to the current gear shift using data maps for the respective gear shifts each made of the vehicle speed set on the abscissa and the accelerator opening set on the ordinate. More specifically, in the case of low-speed operation where the driver depresses the accelerator slightly or in the case of coasting operation at a low speed where the driver releases the accelerator, it is determined that the engine clutch 103a and the automatic transmission assembly clutch 103b are to be engaged in the motor braking mode. In a case where the driver is accelerating the speed or running the vehicle at a high speed, it is determined that the engine clutch 103a and the automatic transmission assembly clutch 103b are to be engaged in the motor driving mode.

In a case where it is determined that the engine clutch 103a and the automatic transmission assembly clutch 103b are to be engaged in the motor braking mode, the flow proceeds to Step 414. In a case where it is not determined that the engine clutch 103a and the automatic transmission assembly clutch 103b are to be engaged in the motor braking mode, the flow proceeds to Step 410 in which the motor braking enable flag is reset to 0. The phrase, "the motor braking enable flag is reset to 0", means that the motor driving mode is finalized.

In Step 414, it is determined whether the absolute value of a difference between the engine clutch rotation number (Nec1) and the automatic transmission assembly clutch rotation number (Ntc1), that is, the clutch rotation number deviation, is equal to or larger than a motor braking release determination value β. Regarding as to which of the clutch engagement determination value α and the motor braking release determination value β is the larger (or the smaller), a relation as follows is established:

clutch engagement determination value α>motor braking release determination value β.

In a case where the clutch rotation number deviation is larger than the motor braking release determination value β, it is determined that the absolute value of a difference between the engine clutch rotation number (Nec1) and the automatic transmission assembly clutch rotation number (Ntc1) is large (the clutch slip is large) and a driving force presently cannot be transmitted efficiently between the engine 101 and the automatic transmission device 104. The flow thus proceeds to Step 410 in which the motor braking enable flag is reset to 0. In a case where the clutch rotation number deviation is smaller than the motor braking release determination value β, it is determined that that the absolute value of a difference between the engine clutch rotation number (Nec1) and the automatic transmission assembly clutch rotation number (Ntc1) is small (the clutch slip is small) and a driving force presently can be transmitted efficiently between the engine 101 and the automatic transmission device 104. The flow thus proceeds to Step 415 in which the motor braking enable flag is set to 1. The phrase, "the motor braking enable flag is set to 1", means that the motor braking mode is finalized.

For example, in a case where the engine clutch 103a directly coupled to the output shaft 102a of the engine 101 and the automatic transmission assembly clutch 103b directly coupled to the input shaft 102b of the automatic transmission assembly 105 can no longer maintain the engagement by the clutch engaging force exerted by the motor braking force regardless of the fact that the vehicle speed (VSP) and the accelerator opening (APS) are maintained in the operation region where the mode should be the motor braking mode, a difference is generated between the engine clutch rotation number (Nec1) and the automatic transmission assembly clutch rotation number (Ntc1) In a case where the absolute value of a difference between the engine clutch rotation number (Nec1) and the automatic transmission assembly clutch rotation number (Ntc1) becomes larger than the motor braking release determination value β, the motor driving mode is selected instead of the motor braking mode, so that the engine clutch 103a and the automatic transmission assembly clutch 103b are engaged by the motor driving force that exerts a larger engaging force than the motor braking force.

Also, the motor braking release determination value β can be determined empirically from a correlation between the drivability (acceleration, deceleration, a feeling of the clutch slip during steady running) of the vehicle and the motor braking release determination value β, which is found by changing the motor braking release determination value in the actual running test of the vehicle.

In Step 416, because the current mode is the motor driving mode in a case where the motor braking enable flag is 0, the conducting pattern of the driver driving and braking unit 213 is switched to the pattern corresponding to the pattern read from the clutch motor rotation position detection sensor 212 in Step 401, so that the clutch motor 106 is driven according to the motor control duty computed in Step 406. On the contrary, because the current mode is the motor braking mode in a case where the motor braking enable flag is 1, the conducting pattern of the driver driving and braking unit 213 is set so that the FETs UH, VH, and WH are switched OFF during the period in which the motor braking enable flag is set to 1 and the FETs UL, VL, and WL are switched ON during the period in which the motor braking enable flag is set to 1 independently of the pattern read from the clutch motor rotation position detection sensor 212, so that the clutch motor 106 is braked by short-circuiting the clutch motor 106.

The respective operations in Step 407 through Step 416 described above are carried out by the motor driving and braking selection unit 209.

FIG. 7 is a chart showing a shift behavior of the automatic transmission device 104 while the vehicle is running. Referring to FIG. 7, a letter A indicates the vehicle speed, and this chart indicates the vehicle speed when the vehicle in a stopped state is started, accelerated, and decelerated. A letter B indicates the accelerator opening (APS). A letter C indicates a target shift speed (dotted line) and the actual shift speed (solid line). Herein, it is up-shifted form the 1 speed to the 2 speed in association with acceleration. A letter D indicates the gear position of the automatic transmission assembly 105. A letter E indicates an engagement/disengagement state of the engine clutch 103a and the automatic transmission assembly clutch 103b. In the chart, at a position OPEN, the engine clutch 103a and the automatic transmission assembly clutch 103b are disengaged and it shows a state where motive power from the engine 101 is not transmitted to the automatic transmission device 104. At a position CLOSE, the engine clutch 103a and the automatic transmission assembly clutch 103b are engaged, and it shows a state where motive power from the engine 101 is transmitted to the automatic transmission device 104.

A letter F indicates a change of the rotation speed of the engine 101. A letter G indicates a change of engine torque. A letter H indicates the rotation number (solid line) of the engine clutch 103a directly coupled to the output shaft 102a of the engine 101 and the rotation number (dotted line) of the automatic transmission assembly clutch 103b directly coupled to the input shaft 102b of the automatic transmission assembly 105. A letter I indicates a target clutch motor current, which is the target current of the clutch motor 106. A letter J indicates the clutch engagement complete flag that is set to 1 in a case where it is determined that the engine clutch 103a and the automatic transmission assembly clutch 103b are engaged and reset to 0 in a case where it is determined that the engine clutch 103a and the automatic transmission assembly clutch 103b are not engaged.

Further, a letter K indicates the motor braking enable flag that is set to 1 in a case where it is determined that the engine clutch 103a and the automatic transmission assembly clutch 103b are to be engaged by the motor braking and reset to 0 in a case where it is determined that the engine clutch 103a and the automatic transmission assembly clutch 103b are to be engaged by the motor driving. A letter L indicates throttle opening that varies with the accelerator opening (APS), a state of the shift control, and so forth. The throttle opening is, for example, in the vicinity of 0 during a shift. A letter M indicates a current consumed by the clutch motor 106 in order to achieve the target clutch current.

Subsequently, operations of FIG. 7 will be described. Referring to FIG. 7, a period from the times t0 to t1 is an interval during which the vehicle is stopped at a vehicle speed of 0 Km/h. In this instance, the accelerator opening (APS) is fully closed and the throttle opening is the idle opening. The engine clutch 103a and the automatic transmission assembly clutch 103b are therefore completely disengaged. The clutch engagement complete flag is thus set to 0. The engine clutch rotation number (Nec1) is the idle rotation number and the automatic transmission assembly clutch rotation number (Ntc1) is 0. In addition, the target shift speed, the actual shift speed, and the gear position are at the 1 speed and the motor braking enable flag is set to 0.

A period from the times t1 to t2 shows a behavior of the vehicle when it is started from a stopped state. The period from the times t1 to t2 is an interval during which engine torque is increased by increasing both the accelerator opening (APS) and the throttle opening by depressing the accelerator while engaging the engine clutch 103a and the automatic transmission assembly clutch 103b. In this instance, the accelerator opening (APS) is increased from the fully closed state, which causes the engine clutch rotation number (Nec1) to increase. Also, the target clutch motor current increases in order to engage the clutch position, and in association with this increase, the actual motor current also increases due to the feedback control. The clutch position therefore moves toward a CLOSE state from an OPEN state by the motor driving force. In association with such a movement, the automatic transmission assembly clutch rotation number (Ntc1) is caused to increase by the clutch rotation number (Nec1). At the time t2, the clutch position is in the CLOSE state, and the engine clutch rotation number (Nec1) and the automatic transmission assembly clutch rotation number (Ntc1) coincide with each other. The engine clutch 103a and the automatic transmission assembly clutch 103b are therefore completely engaged.

A period from the times t2 to t3 is an interval during which the vehicle is moderately accelerating at the 1 speed. At the time t2, because the engine clutch 103a and the automatic transmission assembly clutch 103b are completely engaged, the clutch engagement complete flat is set to 1. In this instance, the vehicle speed (VSP) and the accelerator opening (APS) are in the operation region in which it is determined that the engine clutch 103a and the automatic transmission assembly clutch 103b should be engaged by the motor braking, and because the engine clutch rotation number (Nec1) and the automatic transmission assembly clutch rotation number (Ntc1) coincide with each other, the motor braking enable flag is set to 1.

Accordingly, the motor braking enable flag is set to 1 and the clutch motor 106 is short-circuited by setting the conducting pattern of the driver driving and braking unit 213 in such a manner that the FETs UH, VH, and WH are switched OFF and the FETs UL, VL, and WL are switched ON. The motor driving force thus becomes 0. Nevertheless, the engagement of the engine clutch 103a and the automatic transmission assembly clutch 103b is maintained by the motor braking force. In addition, because the target clutch motor current becomes 0 and the clutch motor 106 is short-circuited, no current is flown into the clutch motor 106.

During a period from the times t3 to t4, both the accelerator opening (APS) and the vehicle speed (VSP) increase and are in the operation region in which it is determined that the clutches are engaged by the motor driving. The motor braking enable flag is therefore reset to 0. Also, because the engine clutch 103a and the automatic transmission assembly clutch 103b are engaged by the motor driving force, an actual motor current corresponding to the target clutch motor current is flown into the clutch motor 106 by the feedback control.

At the time t4, the target shift speed is changed to the 2 speed because of an increase of the vehicle speed (VSP) and a period from the times t4 to t8 shows a behavior when the shift speed is changed from the 1 speed to the 2 speed. Of this period, a period from the times t4 to t5 shows an operation when the engine clutch 103a and the automatic transmission assembly clutch 103b are disengaged. This operation will be described in the following.

At the time t4, the engine clutch rotation number (Nec1) and the automatic transmission assembly clutch rotation number (Ntc1) coincide with each other. Because the engine clutch 103a and the automatic transmission assembly clutch 103b are disengaged during the period from the times t4 to t5, the engine torque is reduced by closing the throttle while at the same the target clutch motor current is increased for changing the clutch position.

In this instance, the actual motor current changes with the target current due to the feedback control, and the engagement of the engine clutch 103a and the automatic transmission assembly clutch 103b is released while the clutch position moves toward the OPEN state from the CLOSE state. The output of the engine clutch 103a directly coupled to the output shaft 102a of the engine 101 is thus no longer transmitted to the automatic transmission assembly clutch 103b. The rotation number of the engine clutch 103a consequently becomes higher than the rotation number of the automatic transmission assembly clutch 103b.

A period from the times t5 to t6 is a state where the clutch position is in the OPEN state and the engine clutch 103a and the automatic transmission assembly clutch 103b are completely disengaged. Because the clutch motor 106 is not driven, no motor current is flown therein. At the time t6, because the engine clutch 103a and the automatic transmission assembly clutch 103b are disengaged, the gear position of the automatic transmission device 104 is changed from the 1 speed to the 2 speed by the automatic transmission assembly control device 107.

A period from the times t7 to t8 shows an operation when the engine clutch 103a and the automatic transmission assembly clutch 103b are engaged. This operation will be described in the following.

At the time t7, the target clutch motor current is increased in order to engage the engine clutch 103a and the automatic transmission assembly clutch 103b. In this instance, the actual motor current is increased by the feedback control, and the automatic transmission assembly clutch rotation number (Ntc1) is caused to increase by the engine clutch rotation number (Nec1) in association with the movement of the automatic transmission assembly clutch 103b toward the CLOSE state from the OPEN state with respect to the engine clutch 103a by the motor driving force.

At the time t8, the engine clutch 103a and the automatic transmission assembly clutch 103b are in the CLOSE state. The engine clutch rotation number (Nec1) and the automatic transmission assembly clutch rotation number (Ntc1) coincide with each other, and the engine clutch 103a and the automatic transmission assembly clutch 103b are completely engaged. It is therefore determined that the shift is completed. The clutch engagement complete flag is thus set to 1 and the actual shift speed is changed to the 2 speed.

A period from the time t9 shows an operation when the accelerator opening (APS) is decreased for deceleration. A period from the times t9 to t10 is a state where the vehicle speed is being reduced at the 2 speed by engaging the engine clutch 103a and the automatic transmission assembly clutch 103b by the motor driving. In this instance, because the engine clutch 103a and the automatic transmission assembly clutch 103b are engaged completely, the engine clutch rotation number (Nec1) and the automatic transmission assembly clutch rotation number (Ntc1) coincide with each other. The clutch engagement complete flag is therefore set to 1. Also, because the engine clutch 103a and the automatic transmission assembly clutch 103b are engaged by the motor driving force, an actual motor current corresponding to the target clutch motor current is flown into the clutch motor 106 by the feedback control.

At and after the time t10, the vehicle speed (VSP) and the accelerator opening (APS) are in the operation region in which it is determined that the engine clutch 103a and the automatic transmission assembly clutch 103b should be engaged by the motor braking. At the time t10, because the engine clutch rotation number (Nec1) and the automatic transmission assembly clutch rotation number (Ntc1) coincide with each other, the motor braking enable flag is set to 1, and the clutch motor 106 is short-circuited by setting the conducting pattern of the driver driving and braking unit 213 in such a manner that the FETs UH, VH, and WH are switched OFF and the FETs UL, VL, and WL are switched ON. The motor driving force thus becomes 0. Nevertheless, the engagement of the clutches is maintained by the motor braking force. In this instance, because the target clutch motor current becomes 0 and the clutch motor 106 is short-circuited, no current is flown into the clutch motor 106.

In a case where the engine clutch 103a directly coupled to the output shaft 102a of the engine 101 and the automatic transmission assembly clutch 103b directly coupled to the input shaft 102b of the automatic transmission assembly 105 can no longer maintain the engagement by the clutch engaging force exerted by the motor braking force regardless of the fact that the vehicle speed (VSP) and the accelerator opening (APS) are maintained in the operation region in which the mode should be the motor braking mode, a difference is generated between the engine clutch rotation number (Nec1) and the automatic transmission assembly clutch rotation number (Ntc1).

In this manner, at and after the time t11, a difference between the engine clutch rotation number (Nec1) and the automatic transmission assembly clutch rotation number (Ntc1) becomes larger than the motor braking release determination value $\beta$. It is therefore determined that the engine clutch 103a and the automatic transmission assembly clutch 103b can no longer maintain the engagement. The motor braking enable flag is thus reset to 0 and the engagement of the engine clutch 103a and the automatic transmission assembly clutch 103b by the motor braking force is stopped, and instead, the engine clutch 103a and the automatic transmission assembly clutch 103b are engaged by the motor driving force. In this instance, an actual motor current corresponding to the target clutch motor current is flown into the clutch motor 106 by the feedback control.

As has been described, it is necessary for the device in the related art to engage the engine clutch 103a and the automatic transmission assembly clutch 103b by constantly keeping a current flown into the clutch motor 106 except when the clutch is disengaged. On the contrary, in this embodiment, because the engine clutch 103a and the automatic transmission assembly clutch 103b are engaged by the motor braking in the interval from t2 to t3 and the interval from t10 to t11 as described above, no current is flown into the clutch motor 106 during these intervals. The fuel efficiency can be therefore improved, the effect of which is environmentally benign.

The control system of a transmission of the invention can be applied to a control system of a transmission that controls a transmission mounted on a vehicle, such as an automobile.

Various modifications and alterations of this invention will be apparent to those skilled in the art without departing from the scope and spirit of this invention, and it should be understood that this is not limited to the illustrative embodiments set forth herein.

What is claimed is:
1. A control system of a transmission comprising:
an engine mounted on a vehicle;
a transmission having a clutch formed of an engine clutch that is connected to an output shaft of the engine so as to transmit motive power of the engine to a transmission assembly portion and a transmission assembly clutch; and
a clutch control unit that engages and disengages the clutch,
wherein the clutch control unit has a clutch motor and a clutch motor controller that controls the clutch motor, and is configured to make the rotation angle of the clutch motor proportional to a stroke volume of the automatic transmission assembly clutch,
wherein the clutch motor controller has:
a target clutch motor current computing unit that computes a target clutch motor current for adjusting torque of the clutch motor to be torque corresponding to an operating state of the vehicle; and
a motor driving and braking selection unit that selects one of a motor driving mode in which the clutch motor is driven by applying feedback control to an output of the clutch motor and a motor braking mode in which the clutch motor is braked by short-circuiting the clutch motor so as to generate braking torque in a direction opposite to the force that causes the automatic transmission assembly clutch to stroke to the disengagement side, and
wherein, in a case where a difference between the rotation number of the engine clutch and the rotation number of the transmission assembly clutch is larger than a predetermined value in the motor braking mode, the motor driving mode is selected by the motor driving and braking unit for driving the clutch motor.

* * * * *